(12) United States Patent
Billings et al.

(10) Patent No.: US 7,418,420 B2
(45) Date of Patent: Aug. 26, 2008

(54) METHOD AND SYSTEM FOR PROVIDING DOWNSIDE PROTECTION OF STOCK MARKET INVESTMENTS

(76) Inventors: James Martin Billings, 910 N. Meyer, Sealy, TX (US) 77474; William Robert Bailey, Jr., 4104 Estars Rd., Apt. 2101, Irving, TX (US) 75038

( * ) Notice: Subject to any disclaimer, the term of this patent is extended or adjusted under 35 U.S.C. 154(b) by 1670 days.

(21) Appl. No.: 09/774,147

(22) Filed: Jan. 30, 2001

(65) Prior Publication Data

US 2002/0103742 A1 Aug. 1, 2002

(51) Int. Cl.
G06Q 40/00 (2006.01)
(52) U.S. Cl. .................... 705/37; 705/35; 705/36 R
(58) Field of Classification Search .............. 705/35–37
See application file for complete search history.

(56) References Cited

U.S. PATENT DOCUMENTS

| | | | | |
|---|---|---|---|---|
| 3,241,070 A * | 3/1966 | Brothman et al. | ........... | 375/345 |
| 4,677,933 A | 7/1987 | Rotella | | |
| 5,297,031 A * | 3/1994 | Gutterman et al. | ............ | 705/37 |
| 6,317,728 B1 * | 11/2001 | Kane | ........................... | 705/37 |
| 2002/0184134 A1 * | 12/2002 | Olsen et al. | .................. | 705/37 |
| 2003/0069826 A1 * | 4/2003 | Guidi et al. | ................... | 705/37 |
| 2005/0273410 A1 * | 12/2005 | Voudrie | ........................ | 705/36 |
| 2005/0273411 A1 * | 12/2005 | Voudrie | ........................ | 705/36 |
| 2005/0273412 A1 * | 12/2005 | Voudrie | ........................ | 705/36 |
| 2005/0278242 A1 * | 12/2005 | Dankovchik et al. | .......... | 705/37 |
| 2005/0283423 A1 * | 12/2005 | Moser et al. | .................. | 705/37 |
| 2006/0047590 A1 * | 3/2006 | Anderson et al. | ............ | 705/35 |
| 2006/0167779 A1 * | 7/2006 | Turner | .......................... | 705/35 |
| 2006/0229959 A1 * | 10/2006 | Heidingsfeld et al. | ......... | 705/35 |
| 2007/0078745 A1 * | 4/2007 | Kalt | .......................... | 705/36 R |
| 2007/0118452 A1 * | 5/2007 | Mather et al. | ............. | 705/36 R |

FOREIGN PATENT DOCUMENTS

JP 2001117974 * 4/2001

OTHER PUBLICATIONS

ADVFN Financial Glossary "MoneyWords" Trailing Stop Less, Copyright 1999-2005.*
OptionsXpress "How to Place Trailing Stop Orders", Copyright 2000-5, pp. 1-4.*
Ken Little "Stocks: Using Trailing Stops to Protect Profits" pp. 1-3.*

(Continued)

Primary Examiner—Narayanswamy Subramanian
(74) Attorney, Agent, or Firm—James Addison Barry, Jr.

(57) ABSTRACT

A method and system for providing downside protection of stock market investments. The present invention allows stock prices to be expressed as a stop loss percentage of the high value the stock price attains rather that a fixed or "hard entered" number. The stop loss percentage of the high value allows stock prices the freedom to increase in price while protecting gains that are being made and still providing downside protection for market declines. The system receives security information input from the user and also data link information of current stock information, the system determines new high values and calculates a sell threshold price based on the stop loss percentage and the high value of the security. When the market price is less than the sell threshold price, the system notifies the user or automatically sells the security.

6 Claims, 16 Drawing Sheets

OTHER PUBLICATIONS

Glynn et al "Trading Securities Using Trailing Stops" Management Science, vol. 41 No. 6 (Jun. 1995) pp. 1096-1106.*

Guppy Daryl "Trading Techniques: Floating stop=loss techniques" Edge (Malaysia) Oct. 23, 2000.*

E*Trade Canada's Trailing Stop Order Service(Date unknown) "www.canada.etrade.com".* http://www.Cybertrader.com, web page screen shot, Jun. 23, 2001, home page, 1 page.

http://www.Cybertrader.com, web page screen shot, Jun. 23, 2001, Trailing Stops, 2 pages.

http://www.Cybertrader.com, web page screen shot, Jun. 23, 2001, Simultaneous Stops and Limits, 1 page.

* cited by examiner

| File Edit Insert Records Window Help | | | |
|---|---|---|---|
| Stock | Shares | Buy Price | Stop Loss Percentage |
| ▶ Alpha | 24 | $33.96 | 8 |
| ▶ | 0 | $ 0.00 | 0 |

Exit

FIG. 2c

File Edit Insert Records Window Help

Stock Portfolio Value

| Stock | Shares | Buy Price | Initial Values | Market Price | Current Value | $ Change | % Change |
|---|---|---|---|---|---|---|---|
| Alpha | 24 | $33.96 | $815.04 | $36.00 | $864.00 | $48.96 | 6.01 % |
| Beta | 42 | $44.50 | $1,869.00 | $46.00 | $1,932.00 | $63.00 | 3.37 % |
| Gamma | 25 | $31.50 | $787.50 | $36.00 | $900.00 | $112.50 | 14.29 % |
| Delta | 10 | $24.50 | $240.00 | $28.00 | $280.00 | $40.00 | 16.67 % |
|  |  |  | $3,711.54 |  | $3,976.00 | $264.46 | 7.13 % |

FIG. 2i

File Edit Insert Records Window Help

| Stock | Shares | Buy Price | Stop Loss Percentage | Stop Loss Amount | Exit |
|---|---|---|---|---|---|
| ▶ Alpha | 24 | $33.96 | 8 | $5.00 | |
| ▶ | 0 | $ 0.00 | 0 | $ 0.00 | |

FIG. 2j

File  Edit  Insert  Records  Window  Help

| Stock | Shares | Buy Price | Stop Loss Percentage | Stop Loss Amount | Exit |
|---|---|---|---|---|---|
| ▶ Alpha | 24 | $33.96 | 8 | $5.00 | |
| ▶ Beta | 42 | $44.50 | 10 | $6.00 | |
| ▶ Gamma | 25 | $31.50 | 9 | $4.25 | |
| ▶ Delta | 10 | $24.00 | 4 | $1.25 | |
| ▶ | 0 | $0.00 | 0 | $0.00 | |

FIG. 2k

METHOD AND SYSTEM FOR PROVIDING DOWNSIDE PROTECTION OF STOCK MARKET INVESTMENTS

TECHNICAL FIELD

The present invention is related to the field of investment tracking systems. More specifically, this disclosure presents a method and system for providing downside protection of stock market investments.

BACKGROUND OF THE INVENTION

Currently, stop losses for stocks must be "hard entered." "Hard entered," describes a fixed value at which the stock will sell. For example, if a person purchases a stock for $100 per share and plans to be out of town for several days, there are limited options to protect the investment from market decline. However, a person might want to sell the stock, for example, if it drops in value to 20 percent of its highest level. The only option currently available is to "hard enter" an $80 (20% drop from $100) stop loss. Yet, if while out of town the stock increases to $150 in price and then begins to drop, the stock would not be sold until it reaches $80. Conventional stop losses can offer downside protection but not upside protection.

Difficulties with the current systems include a failure to provide stop losses to follow the stock up while providing downside protection in case of market decline, a failure to allow protection of gains that could be realized while the investor is unable to "watch" their investment, and a failure to have the "trigger" for selling the stock expressed as a percentage of the purchase price or high value of the stock.

There is also a failure to provide a combination type of protection that would allow for percentage amount protection in a growing market until the percentage increases to a maximum value for the stock at which point the investor or manager desires to changeover to the fixed amount.

Therefore, it is desirable to provide a system and method which provides stop loss protection that tracks and updates the highest price achieved by an investment and that functions by helping to ensure that the price does not drop below a fixed percentage of the latest high price. It is also desirable to provide a system and method that provides the additional option of setting a fixed price drop when the high price crosses a particular threshold to act in substitute for the percentage-based price drop, generally to ensure a smaller loss than the percentage-based price drop, which grows in absolute terms with increases in the latest high price.

SUMMARY OF THE PRESENT INVENTION

It is a primary object of the present invention to provide a method and system for downside protection of stock market investments. This method and system express a stop loss as a percentage of the stock high value rather than a "hard entered" number. It provides a program to allow the stop loss to follow the stock up while providing downside protection in case of market decline. For example, a person purchases $100 per share of stock and plans to be out of town for several days. The person could decide to sell the stock if the price declines 20% in price from the highest level it achieves. Now using the example above, if the stock increases to $150 per share, the program could recalculate a new high value and sell the stock when the value decreases to $120 (20% decline from $150) instead of the $80 in the previous example. This feature would allow protection of gains that could be realized while the investor is unable to "watch" their investment. If the stock were to decline from the purchase price of $100 to $80, the feature would trigger a sell like a conventional stop loss. The exception is that the "trigger" would be expressed as a percentage of the purchase price rather than a "hard entered" number. The program would allow investors to place stop losses on their stocks based on percentage of high value achieved when they could not watch their investments on a moment-to-moment basis. As extended-hour trading becomes an immediate reality, the program would become a greater benefit to investors.

It would also be desirable to provide a hybrid or combination type of program. During a growing market, the stop loss percentage would protect investors by adjusting the sell position as the high value increases. The stop loss percentage would also increase as the high values increase. An investor may desire to limit this stop loss amount from the high value to a maximum stop loss amount. The hybrid or combination program would allow for percentage amount protection in a growing market until the percentage increases to a maximum value for the stock at which point the investor or manager desires to change to the fixed amount.

The system of the present invention, in one embodiment, comprises a method for providing downside protection of stock market investments for managing an investment portfolio by an automated data processing system having a memory with an input device connected with the automated data processing system. Specifically, the method comprises steps of:

a. entering a name of a security into the automated data processing system through the input device;
b. storing the name of the security in the memory;
c. entering a stop loss percentage for the security into the automated data processing system through the input device;
d. storing the stop loss percentage for the security in the memory;
e. entering a buy price of the security into the automated data processing system through the input device;
f. storing the buy price of the security in the memory as the high value;
g. linking the automated data processing system by a data link to current stock information;
h. reading a market price of the security from the current stock information;
i. comparing the market price of the security to the high value, and when the market price of the security exceeds the high value, setting the high value equal to the market price of the security to generate a new high value;
j. storing the new high value for the security in memory as the high value;
k. multiplying the stop loss percentage by the high value and subtracting the resulting product from the high value to generate a sell threshold price;
l. comparing the sell threshold price to the market price, and executing a sell event when the market price is below the sell threshold price; and
m. repeating the linking step g through the comparing the sell threshold price step l until the sell event occurs.

Another embodiment, or aspect, of the present invention further comprises the steps of: entering a maximum stop loss amount into the automated data processing system through the input device, the maximum stop loss amount representing a maximum amount for the security to decrease from the high value at which point the security should be sold; storing the maximum stop loss amount in the memory; comparing the stop loss percentage multiplied by the high value to the maximum stop loss amount, and when the stop loss percentage multiplied by the high value exceeds the maximum stop loss amount the maximum stop loss amount is used to generate the sell threshold price; and calculating the sell threshold price using the maximum stop loss amount by subtracting the maximum stop loss amount from the high value of the security.

Yet another embodiment, or aspect, of the present invention the sell event includes printing a summary of the sell information.

The present invention includes a computer-readable medium having imprinted therein a computer program containing instruction steps such that upon installation of the computer program in a general-purpose computer, the computer is capable of performing the method of the present invention.

A system of the present invention, in one embodiment, comprises an input device for receiving entry of a name of a security, a stop loss percentage for the security, and a buy price for the security by a user, and for receiving entry of a market price of the security; a memory operationally connected to the input device for storing the name of the security, the stop loss percentage for the security, the buy price for the security, and a high value for the security; an automated data processor operationally connected with the input device and the memory, the automated data processor being operative for determining if the market price is higher than the high value of the security, and for determining if the market price of the security is less than a sell threshold price where the sell threshold price is the product of the stop loss percentage times the high value of the security and if so then for initiating a sell event; and an output device for notifying the user of the sell event.

In another embodiment of the present invention, the present invention output device further comprises the means for automatically selling the security when the sell event occurs.

In yet another embodiment or aspect of the present invention, the system includes the input device wherein the input device is configured to receive the market price of the security and includes a data link connected to provide current stock information for entering the current market price.

In another embodiment or aspect of the present invention, the input device includes a means for entering a maximum stop loss amount; the memory includes a means for storing the maximum stop loss amount; and the processor includes a means for determining if the market price is less than the high value minus the maximum stop loss amount, and when the market price is less than the high value minus the maximum stop loss amount, calculating the sell threshold price by subtracting the maximum stop loss amount from the high value.

BRIEF DESCRIPTION OF THE DRAWINGS

These and other features, aspects, and advantages of the present invention will become better understood with regard to the following description, appended claims, and accompanying drawings where:

FIG. 2c is a screen shot illustrating an Add Client Stock Information screen of the Add Client Stock selection of an embodiment of the present invention;

FIG. 2i is a screen shot illustrating the Stock Portfolio Value screen of the Portfolio Value Report selection of an embodiment of the present invention;

FIG. 2j is a screen shot illustrating another Add Client Stock Information screen of the Add Client Stock selection of an embodiment of the present invention;

FIG. 2k is a screen shot illustrating another Edit Client Stock screen of the Edit Client Stock selection of an embodiment of the present invention;

DETAILED DESCRIPTION

The present invention relates to the field of stock market computer programs. More specifically, this disclosure presents a method and system for providing downside protection of stock market investments. The following description is presented to enable one of ordinary skill in the art to make and use the invention and to incorporate it in the context of particular applications. Various modifications, as well as a variety of uses in different applications will be readily apparent to those skilled in the art, and the general principles defined herein may be applied to a wide range of embodiments. Thus, the present invention is not intended to be limited to the embodiments presented, but is to be accorded the widest scope consistent with the principles and novel features disclosed herein.

The present invention is useful for providing downside protection of stock market investments. A few of the goals of the present invention include allowing stock prices to be expressed as a stop loss percentage rather than a "hard entered" number, and allowing stock prices the freedom to increase in price while protecting gains that have been made while providing downside protection due to market declines.

Much of this system of providing downside protection of stock market investments involves buying, selling and monitoring securities, so some definitions are presented for clarity of terminology. "Hard entered," describes a fixed value at which the stock will sell. Downside is defined as a potential loss incurred by the investor after initial gain. This refers to the possibility of decline of the market price of the stock. Upside is defined as a gain beyond initial purchase price or the possibility of increases in the market price of the stock. High value is the maximum value reached by security during ownership. The high value could be either the initial buy price or the updating ticker value. Stop loss is defined as a tool used by investors to limit losses by identifying parameters within which a stock will be bought or sold. It is the maximum amount a buyer will risk on the security. Sliding stop loss is defined as the stop loss adjusted for the high value of the security. The sliding stop loss value follows or slides along with the constantly changing value of the stock. Stop loss percentage is defined as a percentage of the high value reached by the security that will be placed at risk. Sell threshold price is a value at which a security will be sold to protect gains. Break point is an abbreviated name for the sell threshold price. Sell event is when a threshold has been met and the invention recommends selling the security to maximize gains. Maximum stop loss amount is a maximum acceptable level of loss in a security expressed in an explicit dollar amount that will trigger a sell event.

Figure 1:
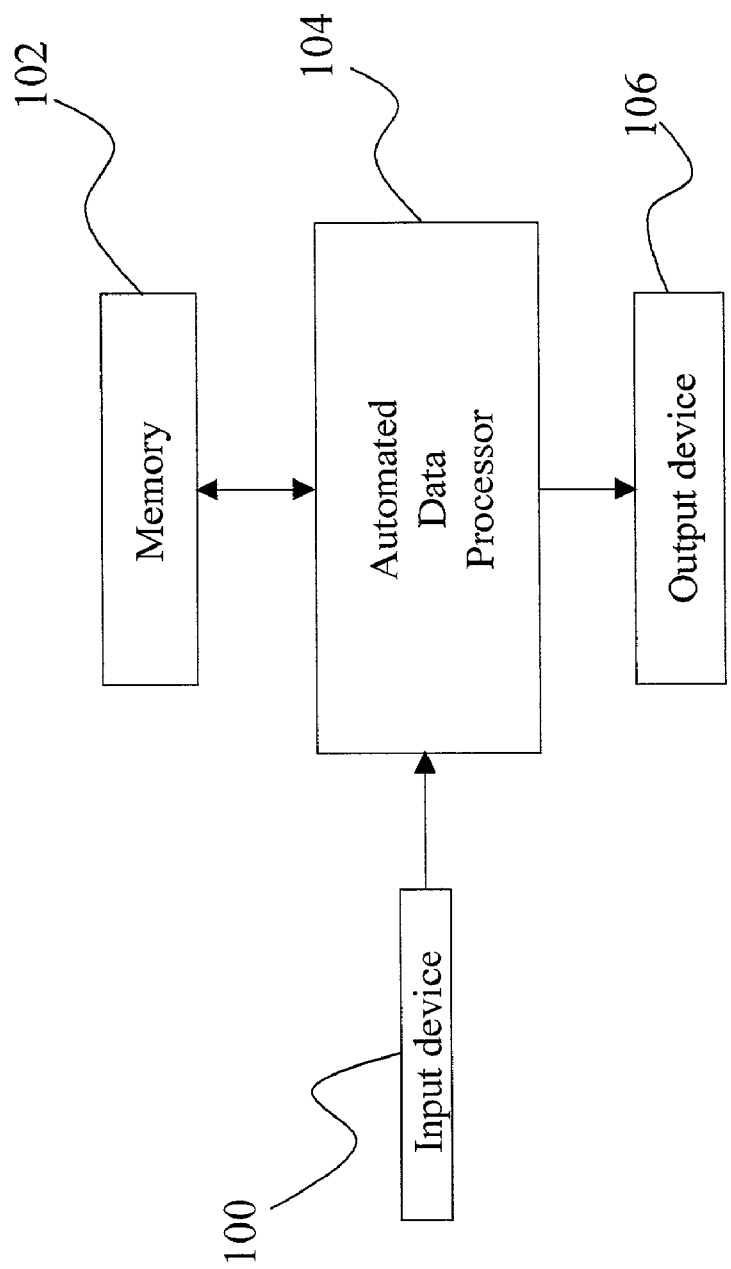
FIG. 1 is a block diagram depicting an embodiment of the present invention.

A block diagram depicting an embodiment of the present invention is shown in FIG. 1. This embodiment comprises an input device 100, an automated data processor 104 operationally connected to the input device 100 for receiving data and information from the input device 100, a memory 102 operationally connected to the automated data processor 104 for receiving data from the automated data processor 104 and storing the data in memory 102 and providing the data to the automated data processor 104, and an output device 106 operationally connected to the automated data processor 104 for notifying the user to sell the security or for automatically selling the security. The present invention may be utilized on a general-purpose computer, such as an IBM compatible PC, VAX, Mac or other computer known to those in the art. Additionally, the storing, reading, comparing, and multiplying could be encoded onto special purpose chips for creating special purpose hardware for carrying out the present invention. The present invention could be implemented on a wide area network, local area network, through a dial up connection to a dedicated machine, through an Internet or intranet connection. The input device 100 may include a keyboard for input of a name of a security, a buy price of the security, a stop loss percentage for the security, and a market price of the security. The input device 100 may further include a data link connecting the automated data processor 104 and a data source of current stock information for reading a market price of the security from current stock information. The memory 102 has the capability of storing the name of at least one security, the buy price of the security, the high value of the security, and the stop loss percentage of the security. The automated data processor 104 is operable for comparing the market price with the high value and determining if the market price is higher, multiplying the stop loss percentage times the high value subtracted from the high value to generate a sell threshold price, comparing the sell threshold price to the market price, and executing a sell event when the market price is below the sell threshold price, and receiving input information and storing the information input into memory. The output device 106 is communicatively connected with the automated data processor 104 and is capable of receiving a signal to execute a sell event. When the sell event is received the output device could notify a user to sell the stock or it could automatically execute a sell order for the security.

Figure 2A:
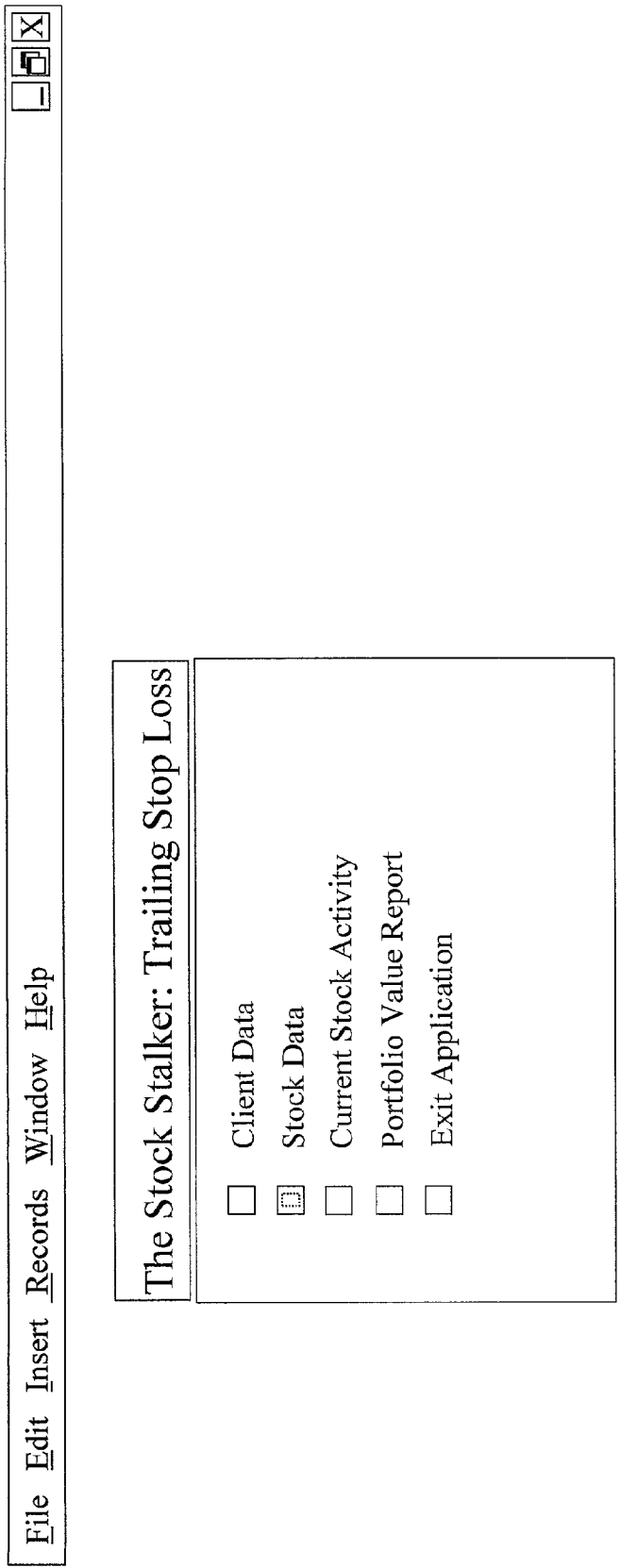
FIG. 2a is a screen shot illustrating an example of an opening menu and depicting a selection of the Stock Data screen of an embodiment of the present invention.
Figure 2B:
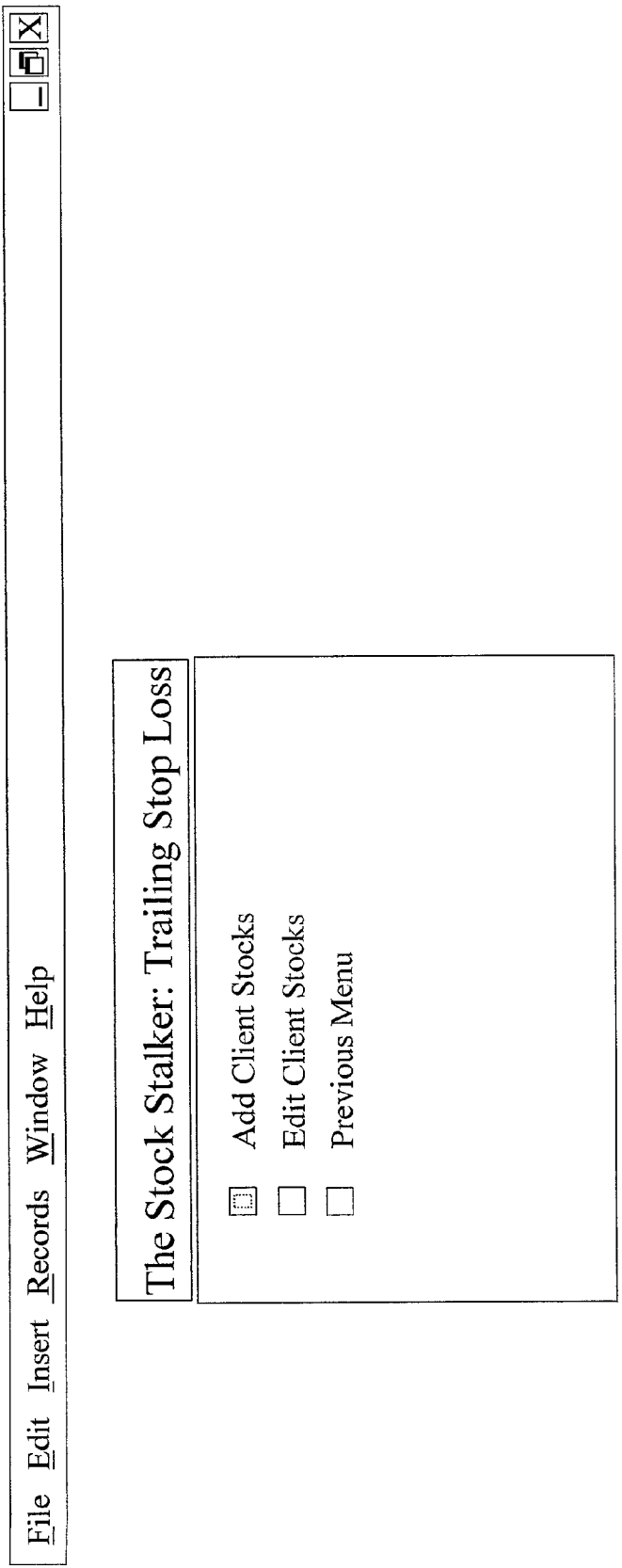
FIG. 2b is a screen shot illustrating the Stock Data screen and depicting the selection of an Add Client Stock screen of an embodiment of the present invention.
Figure 2D:
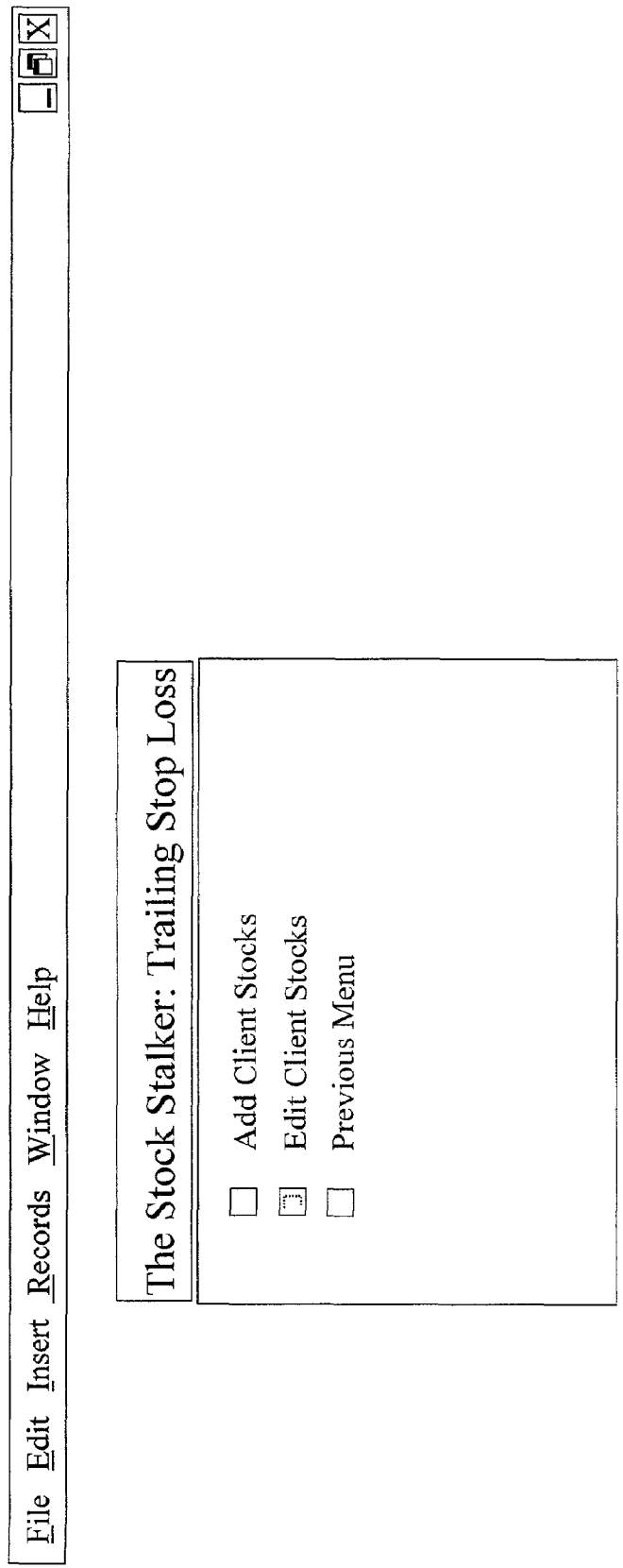
FIG. 2d is a screen shot illustrating the Stock Data screen and depicting the selection of an Edit Client Stock screen of an embodiment of the present invention.
Figure 2E:
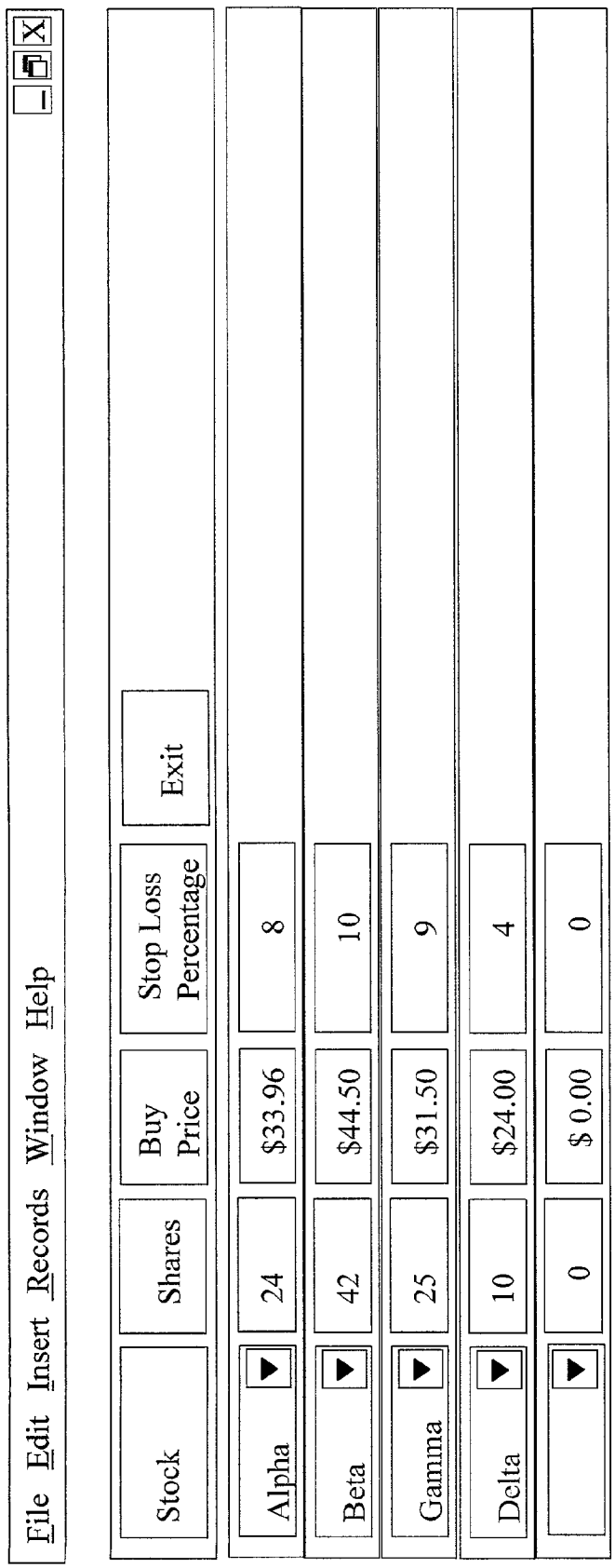
FIG. 2e is a screen shot illustrating the Edit Client Stock screen of the Edit Client Stock selection of an embodiment of the present invention.
Figure 2F:
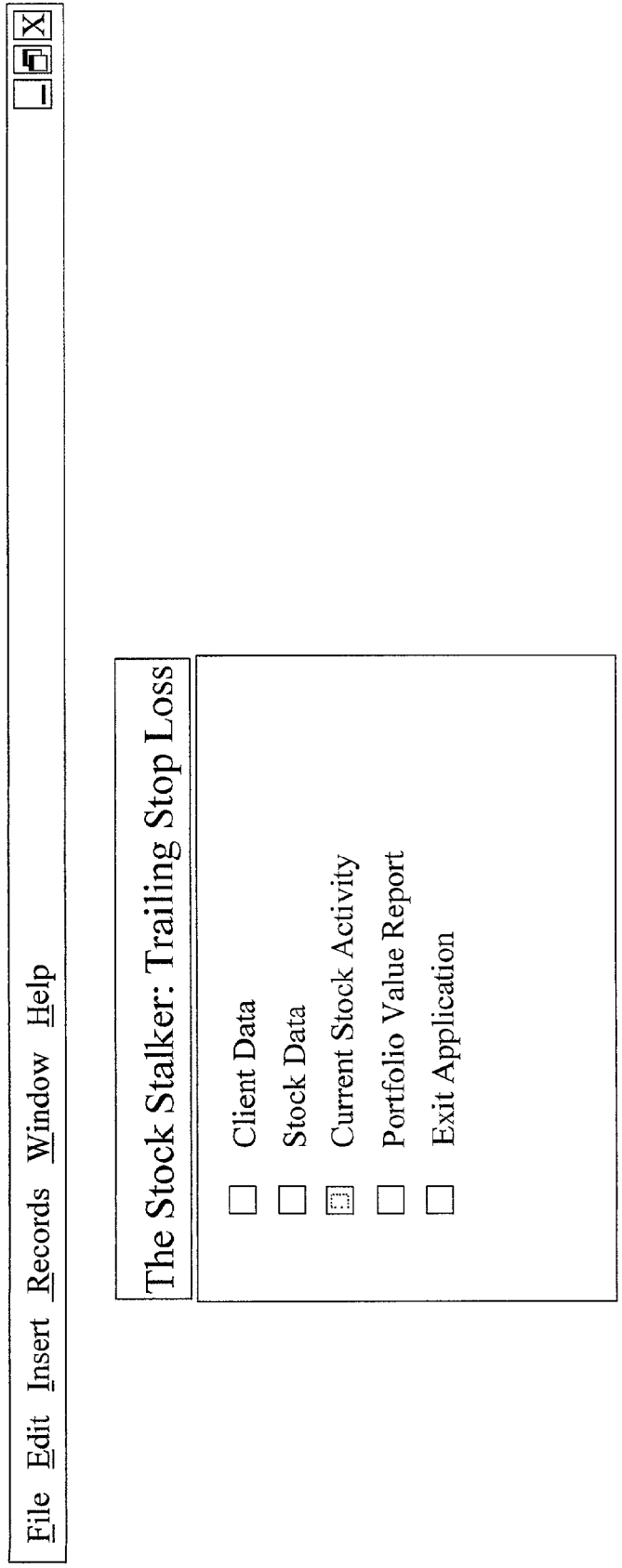
FIG. 2f is a screen shot illustrating the opening menu and depicting the selection of a Current Stock Activity screen of an embodiment of the present invention.
Figure 2G:
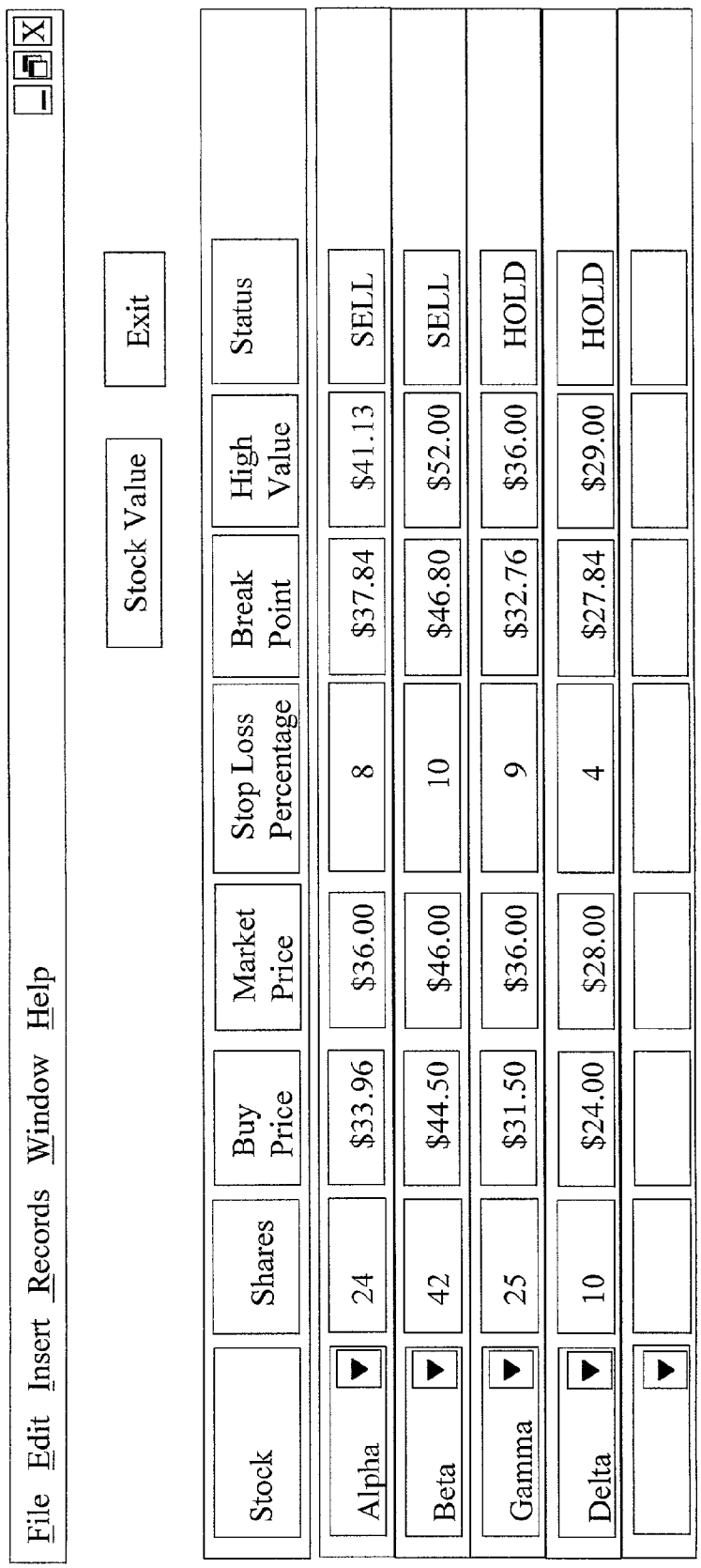
FIG. 2g is a screen shot illustrating the Current Stock Activity screen of an embodiment of the present invention.
Figure 2H:
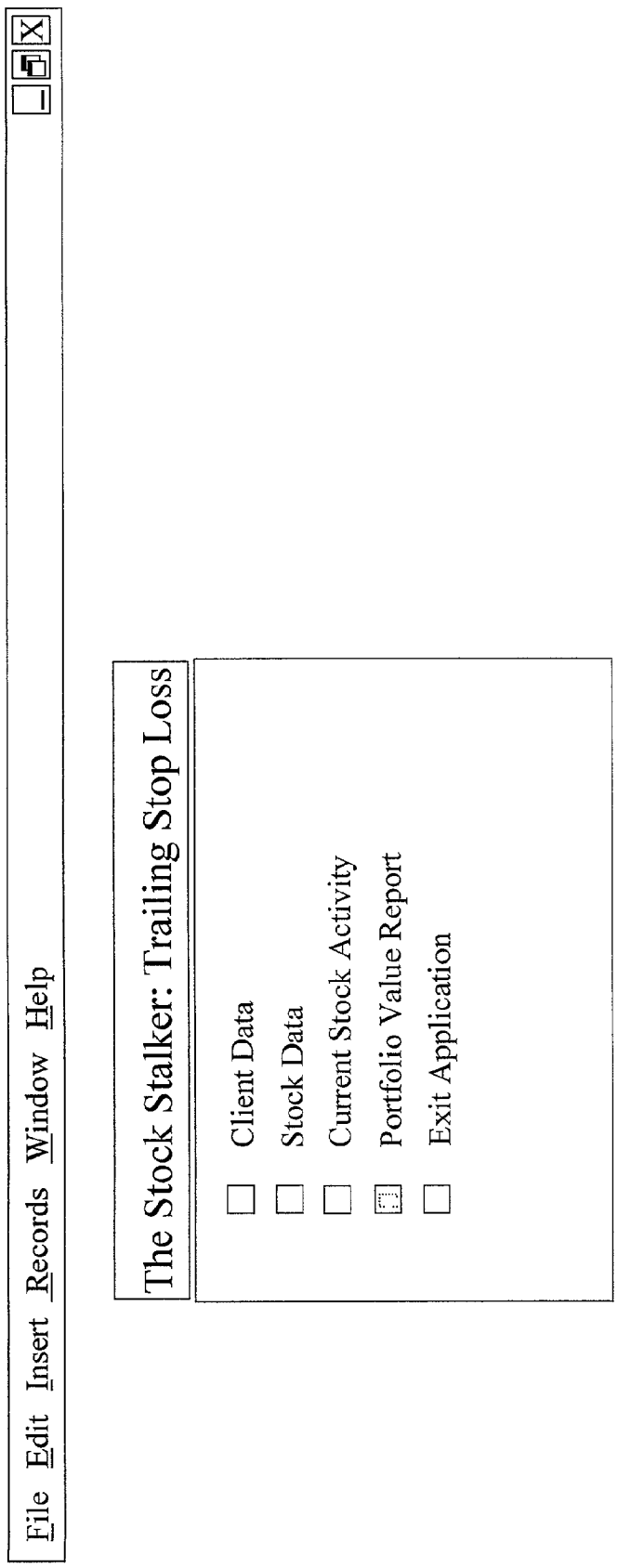
FIG. 2h is a screen shot illustrating the opening menu and depicting the selection of a Portfolio Value Report screen of an embodiment of the present invention.

FIGS. 2*a* through 2*i* provide example screen shots to further clarify the use of an embodiment of the present invention. The screen shots are provided to assist the reader in gaining a clear understanding of the method of the present invention. The screen shots are merely provided as examples of user interface and are not material to the substance of the invention. An example of a typical screen shot illustrating the opening menu screen is shown in FIG. 2*a*, specifically depicting the user selecting the Stock Data screen. Next, an example of a typical screen shot illustrating the Stock Data screen is shown in FIG. 2*b*, specifically depicting the user selecting the Add Client Stock screen. An example of a typical screen shot illustrating the Add Client Stock Information screen is shown in FIG. 2*c*, specifically depicting the user adding a stock name, a number of shares, a buy price and a stop loss percentage. Next, an example of a typical screen shot illustrating the Stock Data screen is shown in FIG. 2*d*, specifically depicting the user selecting the Edit Client Stock screen. An example of a typical screen shot illustrating the Edit Client Stock Information screen is shown in FIG. 2*e*. Another example of a typical screen shot illustrating the opening menu screen is shown in FIG. 2*f*, this screen shot specifically depicts the user selecting the Current Stock Activity screen. Next, an example of a typical screen shot illustrating the Current Stock Activity screen is shown in FIG. 2*g*, specifically depicting the name, stop loss percentage, the high value, the status of the security as well as other information. A further example of a typical screen shot illustrating the opening menu screen is shown in FIG. 2*h*, this screen shot specifically depicting the user selecting the Stock Portfolio Value screen. Next, an example of a typical screen shot illustrating the Stock Portfolio Value screen is shown in FIG. 2*i*, specifically depicting the name, number of shares, buy price, initial values, the market price, the current value, and dollar and percentage changes.

Additional embodiments may include the input device 100 and memory 102 with the capability to additionally input and store a maximum stop loss amount. The automated data processor 104 would also have the operability to compare the stop loss percentage multiplied by the high value to the maximum stop loss amount and when the stop loss percentage multiplied by the high value exceeds the maximum stop loss amount use the maximum stop loss amount to generate the sell threshold price. The maximum stop loss amount is subtracted from the high value to generate the sell threshold price using the maximum stop loss amount. This hybrid or combination stop loss feature would be useful where a percentage of stop loss is desired during the early growth stages of a stock or security when a percentage of the high value is relatively small. As the stock or security grows the percentage of the high value can become quite large, and at this point at a fixed amount of stop loss may become desirable. This hybrid or combination stop loss feature would automatically transition from the stop loss percentage to the fixed amount at the point where the two values crossover. FIGS. 2*j* and 2*k* provide additional example screen shots to further clarify the use of other embodiments of the present invention. An example of a typical screen shot illustrating the Add Client Stock Information screen is shown in FIG. 2*j*, specifically depicting the additional feature of a stop loss amount in addition to the stock name, the number of shares, the buy price and the stop loss percentage. An example of a typical screen shot illustrating the Edit Client Stock Information screen is shown in FIG. 2*k*.

The present invention contemplates a computer-readable medium including a computer program containing instruction steps such that upon installation of the computer program in a general-purpose computer the methods of the present application could be performed.

Figure 3:
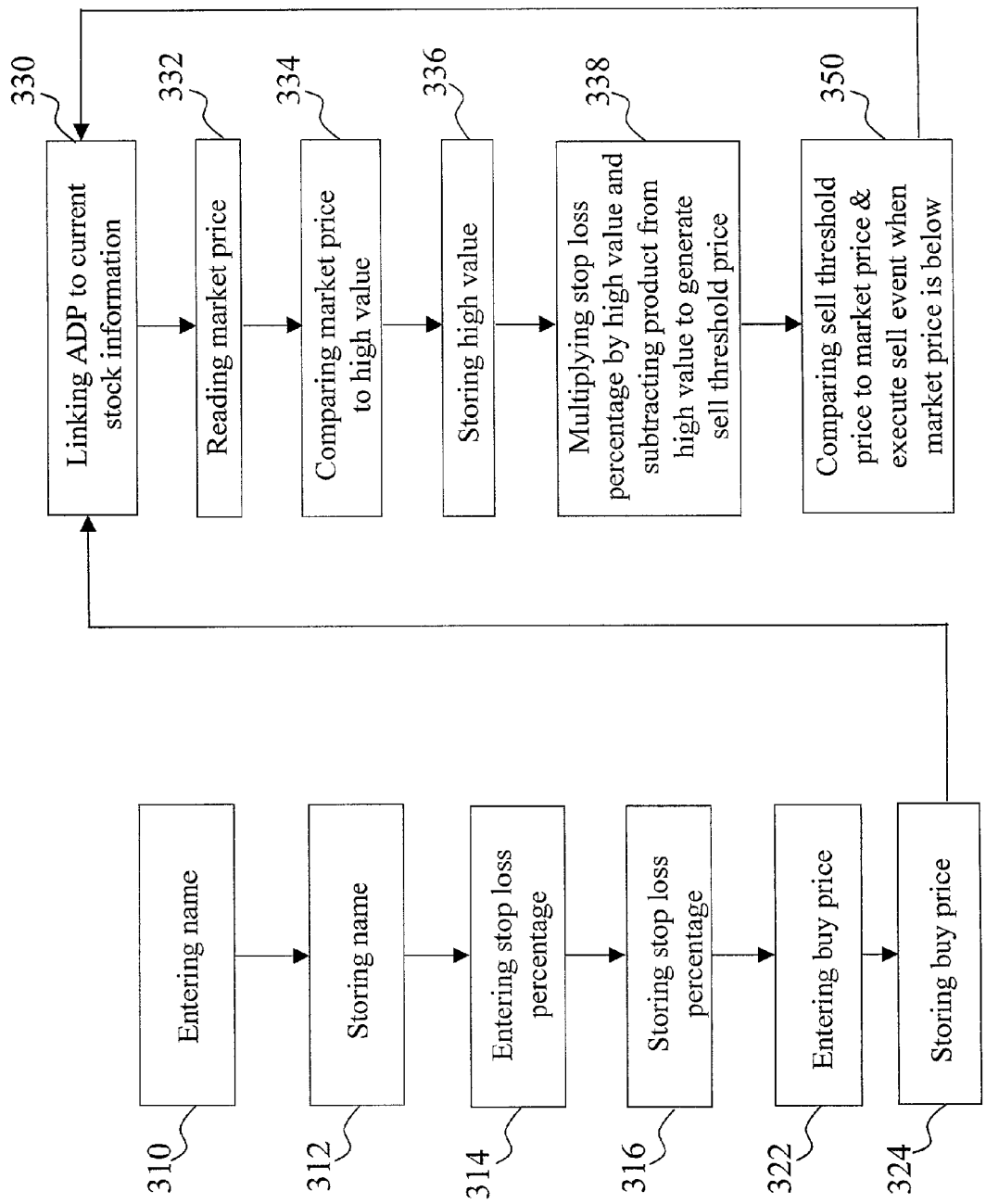
FIG. 3 is a flow chart depicting the steps in the method of an embodiment of the present invention.
Figure 5:
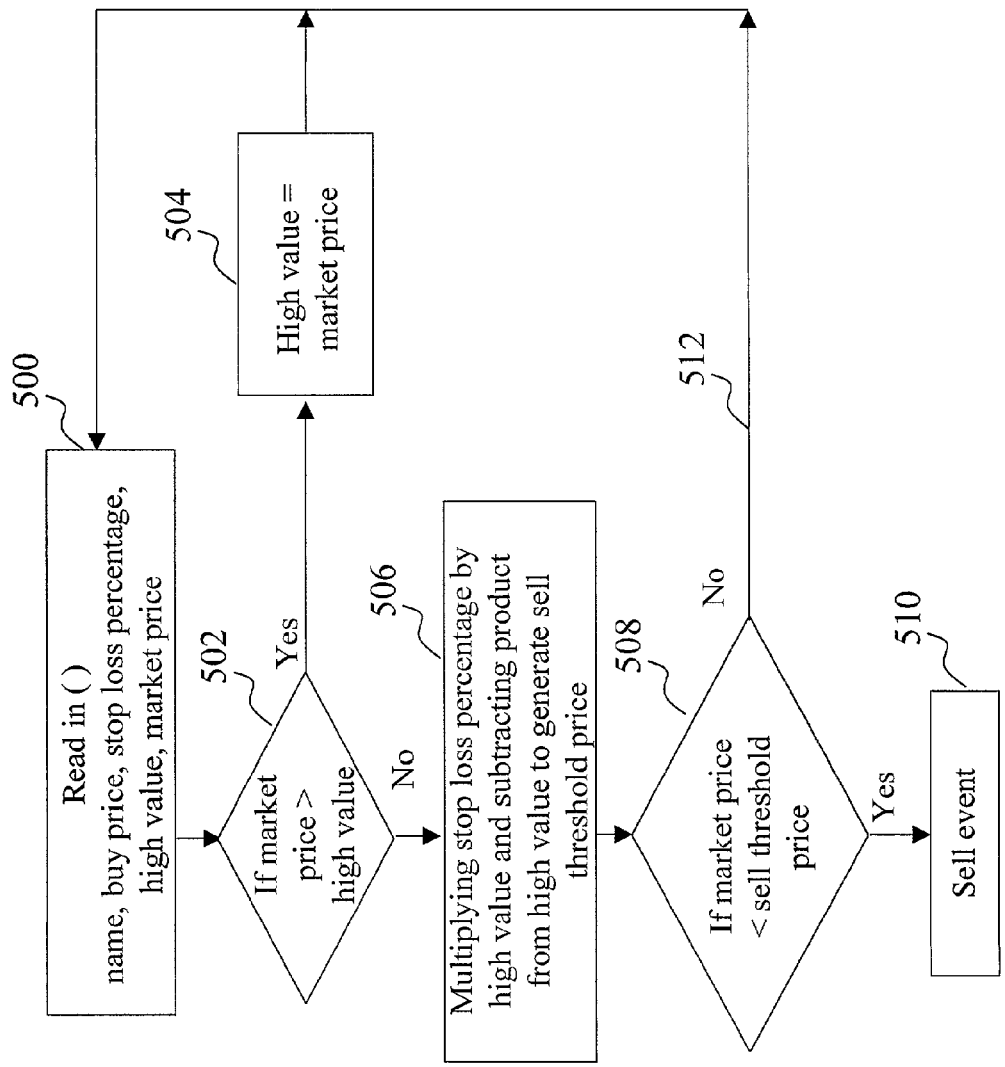
FIG. 5 is a logic chart depicting the sequence of operations of an embodiment of the present invention.

The present invention also relates to a method for providing downside protection of stock market investments. A flow chart depicting the steps in the method of an embodiment of the present invention is shown in FIG. 3. Additionally a logic chart depicting the sequence of operations of an embodiment of the present invention is shown in FIG. 5. This method comprises the following steps: first, an entering a name of a security step 310 is performed, wherein the name of the security is entered into the automated data processing system through the input device. Next in a storing the name of the security step 312, the entered name of the security is stored in memory by the automated data processing system. Next in an entering stop loss percentage of security step 314, the stop loss percentage of the security is entered into the automated data processing system through the input device. The stop loss percentage represents a percentage stop loss from the high value for the security at which point the security should be sold. Next in a storing the stop loss percentage step 316, the stop loss percentage of the security is stored in memory by the automated data processing system. Next in an entering the buy price of the security step 322, the buy price of the security is entered into the automated data processing system through the input device. Next in a storing the buy price step 324, the buy price of the security is stored in memory by the automated data processing system.

Examples of interfaces for the user entry inputs are depicted in FIGS. 2c and 2e. Next in a linking step 330, the automated data processing system is linked by a data link to current stock information. The preferred method of linking this data is by a data feed from the Internet, but other telecommunications or memory storage data sources could be utilized, such as by compact disk, computer diskette, e-mail file transfer, or modem link to another computer system. The Internet is a network connecting many computers all over the world, through phone lines and connection hubs (servers), which coordinate the transfer of data from one computer to another. Some computers on the Internet have stock and investment data, and information from a number of these computers is accessed to feed data into the automated data processor of the invention. Data from other types of computer networks could also be utilized. Next in the reading market price of security step 332, the automated data processor reads the market price of the security from the data in the current stock information. Input steps 310, 314, 322, and 332 are depicted as the Read in ( ) step 500 in a logic chart showing the sequence of operations shown in FIG. 5. Next in the comparing market price step 334, the automated data processor compares the market price of the security to the high value, and when the market price of the security exceeds the high value setting the high value is set equal to the market price of the security. Step 334 of FIG. 3 is represented as the if market price>high value logic step 502 shown in FIG. 5. Next in a storing the high value step 336, the new high value is stored in memory for future comparisons of market prices. The high value=market price logic step 504 shown in FIG. 5 corresponds to storing the high value step 336. Next in the multiplying stop loss percentage by high value step 338, the stop loss percentage is multiplied with the high value of the security and the result is subtracted from the high value to generate the sell threshold price. This is also depicted as the multiplying stop loss percentage by high value step 506 as shown in FIG. 5. Next in a comparing the sell threshold price step 350, the sell threshold price is compared to the market price and when the market price is below the sell threshold price a sell event is executed. The sell event is an output to the user that the stock should be sold. An example of an output to the user is depicted in FIG. 2g as a sell status on the Current Stock Activity screen. The user could also designate that the sell event is actually selling the security over the data link established by the automated data processor. The sell event step 510 is depicted in the logic chart shown in FIG. 5. In steady-state operation, the linking step 330 through the comparing sell threshold price step 350 is repeated until the sell event occurs. This is depicted as the path 512 in the logic flow chart depicting the sequence of operations of this embodiment of the present invention shown in FIG. 5.

Figure 4:
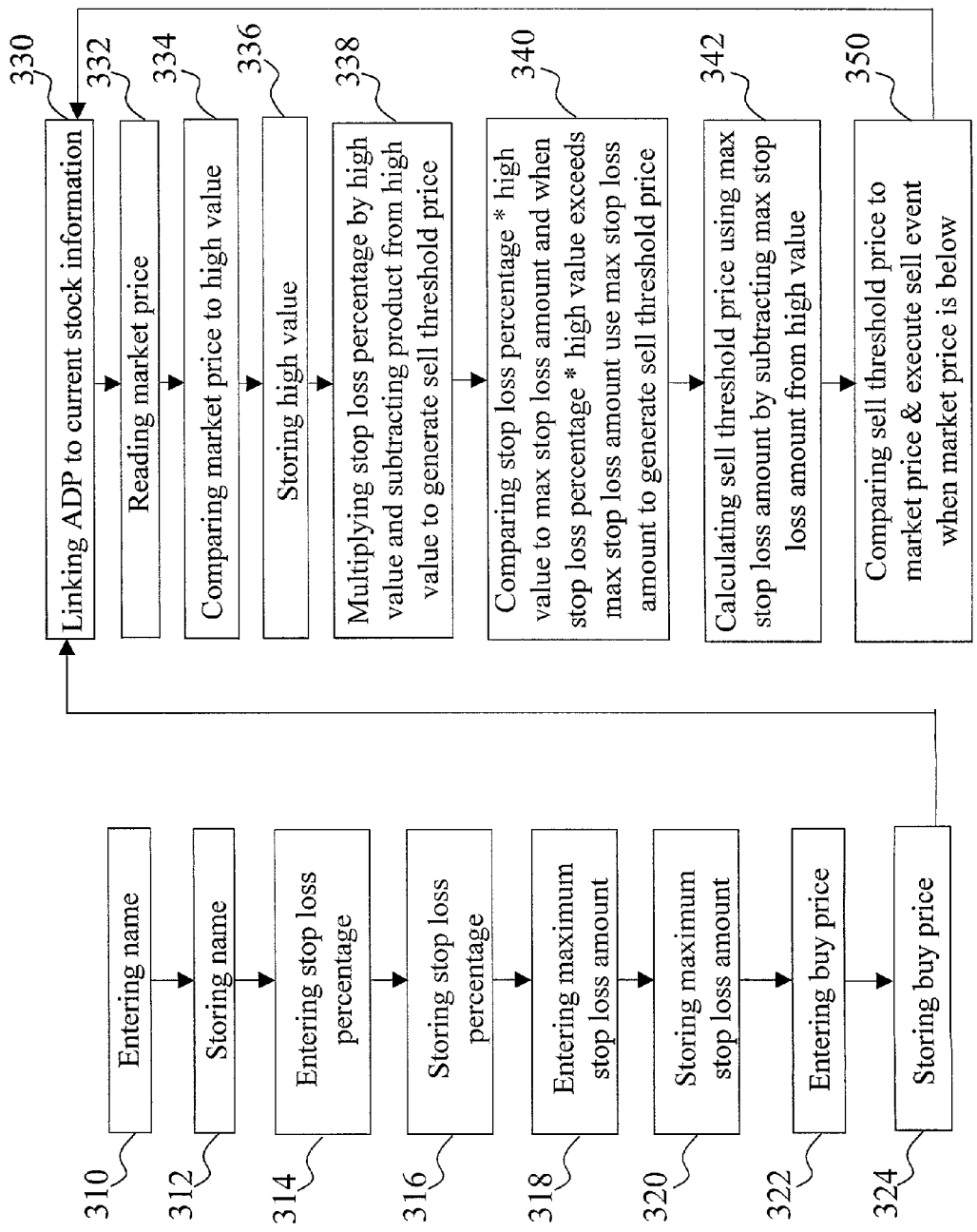
FIG. 4 is a flow chart depicting the steps in the method of another embodiment of the present invention.
Figure 6:
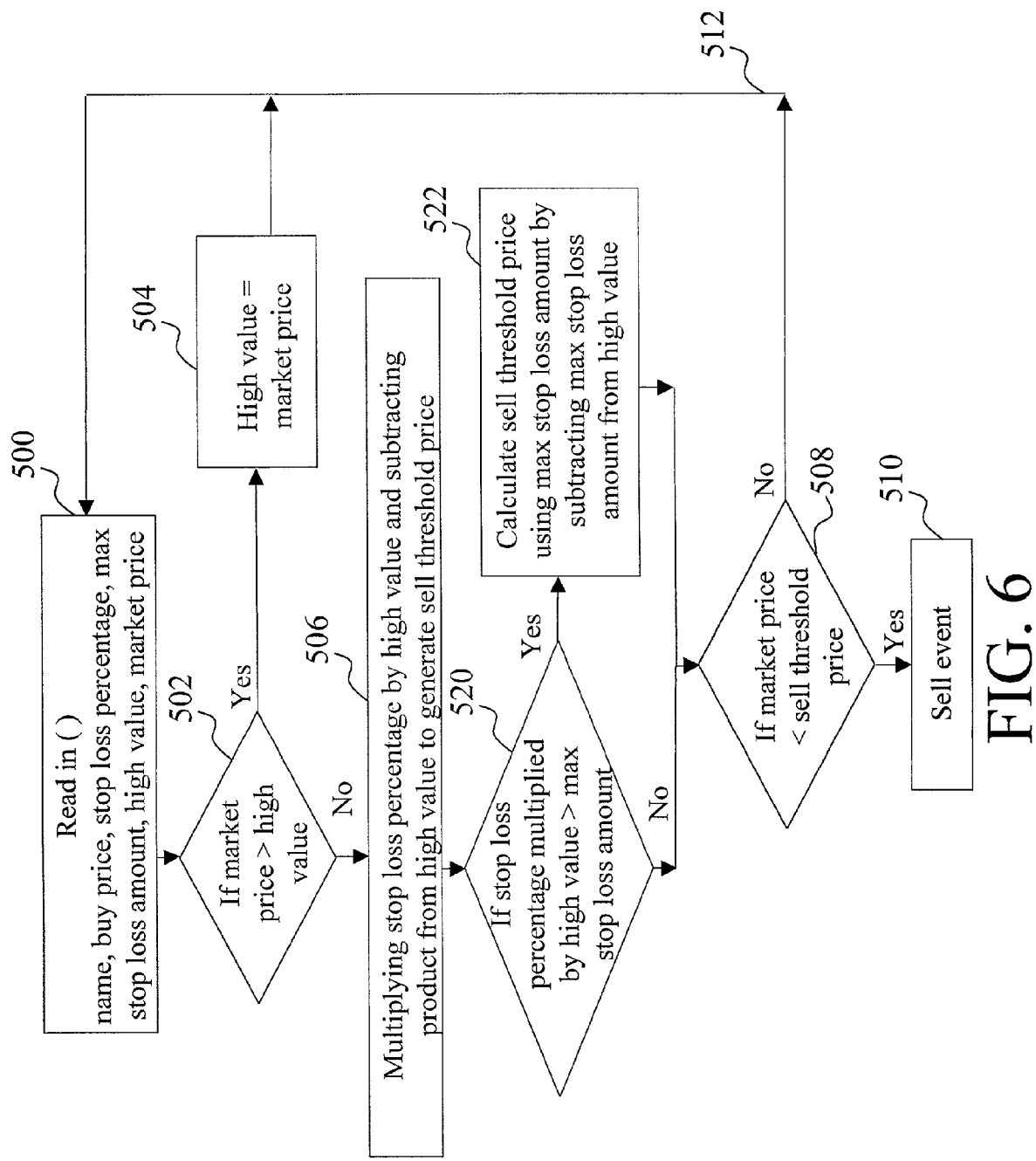
FIG. 6 is a logic chart depicting the sequence of operations of another embodiment of the present invention.

A flow chart depicting the steps in the method of another embodiment of the present invention is shown in FIG. 4. This embodiment further comprises the step of: entering a maximum stop loss amount step 318, wherein the maximum stop loss amount is entered into the automated data processing system through the input device. The maximum stop loss amount represents a maximum amount for the security to decrease from the high value at which point the security should be sold. An example of the maximum stop loss amount entry is depicted in FIGS. 2j and 2k. Next in the storing the maximum stop loss amount step 320, the maximum stop loss amount entered through the input device is stored in memory. Next in the comparing the stop loss percentage multiplied by the high value to the maximum stop loss amount step 340, the stop loss percentage multiplied by the high value is compared to the maximum stop loss amount and when the stop loss percentage multiplied by the high value exceeds the maximum stop loss amount, the maximum stop loss amount is used to generate the sell threshold price. The maximum stop loss amount step 340 corresponds with the if stop loss percentage logic step 520 shown in FIG. 6. Next in the calculating the sell threshold price using the maximum stop loss amount step 342, the maximum stop loss amount is subtracted from the high value of the security to generate the sell threshold price. An example of the calculating the sell threshold price using the maximum stop loss amount step 342 is also shown in the logic flow chart depicting the sequence of operations as the calculate sell threshold price using max stop loss amount step 522 shown in FIG. 6.

In another embodiment of the present invention, the sell event may include an option wherein the sell information is printed for the user. The sell information could include but not be limited to the name, buy price, the high value, and the sell price.

What is claimed is:

1. A method for providing downside protection of stock market investments for managing an investment portfolio by an automated data processing system having a memory with an input device connected with the automated data processing system, the method comprising the steps of:
   a. entering a name of a security into the automated data processing system through the input device;
   b. storing the name of the security in the memory;
   c. entering a stop loss percentage for the security into the automated data processing system through the input device;
   d. storing the stop loss percentage for the security in the memory;
      i. entering a maximum stop loss currency amount into the automated data processing system through the input device, the maximum stop loss currency amount representing a maximum currency amount for the security to decrease from the high value at which point the security should be sold; and
      ii. storing the maximum stop loss currency amount in the memory;
   e. entering a buy price of the security into the automated data processing system through the input device;
   f. storing the buy price of the security in the memory as the high value;
   g. linking the automated data processing system by a data link to current stock information;

h. reading a market price of the security from the current stock information;
i. comparing the market price of the security to the high value, and when the market price of the security exceeds the high value, setting the high value equal to the market price of the security to generate a new high value;
j. storing the new high value for the security in memory as the high value;
k. multiplying the stop loss percentage by the high value and subtracting the resulting product of the stop loss percentage multiplied by the high value from the high value to generate a sell threshold price;
　i. comparing the stop loss percentage multiplied by the high value to the maximum stop loss currency amount, and if the stop loss percentage multiplied by the high value exceeds the maximum stop loss currency amount, the maximum stop loss currency amount is used to generate the sell threshold price; and
　ii. calculating the sell threshold price using the maximum stop loss currency amount by subtracting the maximum stop loss currency amount from the high value of the security;
l. comparing the sell threshold price to the market price, and executing a sell event when the market price is below the sell threshold price; and
m. repeating the linking step g through the comparing the sell threshold price step 1 until the sell event occurs.

2. A method for providing downside protection of stock market investments as set forth in claim 1 wherein the sell event further includes printing a summary of the sell information.

3. A system for providing downside protection of stock market investments comprising:
　a. an input device for receiving entry of a name of a security, a stop loss percentage for the security, a maximum stop loss currency amount, and a buy price for the security by a user, and for receiving entry of a market price of the security;
　b. a memory operationally connected to the input device to store the name of the security, the stop loss percentage for the security, the maximum stop loss currency amount, the buy price for the security, and a high value for the security; and
　c. an automated data processor operationally connected with the input device and the memory, the automated data processor for determining if the market price is higher than the high value of the security, for determining if the market price of the security is less than a sell threshold price where the sell threshold price is the product of the stop loss percentage times the high value of the security subtracted from the high value of the security and if so then to initiate a sell event, and for determining if the stop loss percentage multiplied by the high value exceeds the maximum stop loss currency amount, the maximum stop loss currency amount is used to generate the sell threshold price by calculating the sell threshold price using the maximum stop loss currency amount by subtracting the maximum stop loss currency amount from the high value of the security and if market price of the security is less than the sell threshold price then to initiate a sell event.

4. A system for providing downside protection of stock market investments as set forth in claim 3 wherein the output device further comprises the means for automatically selling the security when the sell event occurs.

5. A system for providing downside protection of stock market investments as set forth in claim 4 wherein the input device is configured to receive the market price of the security and includes:
　a. a data link connected to provide current stock information for entering the current market price.

6. A computer-readable medium having imprinted therein a computer program containing instruction steps such that upon installation of the computer program in a general-purpose computer provides for downside protection of stock market investments in an investment portfolio and cause the general-purpose computer to perform the steps of:
　a. receiving a name of a security into the automated data processing system through the input device;
　b. storing the name of the security in the memory;
　c. receiving a stop loss percentage for the security into the automated data processing system through the input device;
　d. storing the stop loss percentage for the security in the memory;
　　i. receiving a maximum stop loss currency amount into the automated data processing system through the input device, the maximum stop loss currency amount representing a maximum currency amount for the security to decrease from the high value at which point the security should be sold; and
　　ii. storing the maximum stop loss currency amount in the memory;
　e. receiving a buy price of the security into the automated data processing system through the input device;
　f. storing the buy price of the security in the memory as the high value;
　g. linking the automated data processing system by a data link to current stock information;
　h. reading a market price of the security from the current stock information;
　i. comparing the market price of the security to the high value, and when the market price of the security exceeds the high value, setting the high value equal to the market price of the security to generate a new high value;
　j. storing the new high value for the security in memory as the high value;
　k. multiplying the stop loss percentage by the high value and subtracting the resulting product from the high value to generate a sell threshold price;
　　i. comparing the stop loss percentage multiplied by the high value to the maximum stop loss currency amount, and if the stop loss percentage multiplied by the high value exceeds the maximum stop loss currency amount, the maximum stop loss currency amount is used to generate the sell threshold price, and
　　ii. calculating the sell threshold price using the maximum stop loss currency amount by subtracting the maximum stop loss currency amount from the high value of the security;
　l. comparing the sell threshold price to the market price, and executing a sell event when the market price is below the sell threshold price; and
　m. repeating the linking step g through the comparing the sell threshold price step 1 until the sell event occurs.

\* \* \* \* \*